Oct. 25, 1966  V. HOROWITZ  3,281,604

POLARIZING LIGHT ATTENUATOR FOR PHOTO-CONDUCTIVE CELLS

Filed Sept. 4, 1963

INVENTOR
VICTOR HOROWITZ
BY Hurvitz & Rose
ATTORNEYS

3,281,604
POLARIZING LIGHT ATTENUATOR FOR PHOTO-CONDUCTIVE CELLS

Victor Horowitz, Oceanside, N.Y., assignor to Ebert Electronics Corp., Floral Park, N.Y., a corporation of New York
Filed Sept. 4, 1963, Ser. No. 306,444
5 Claims. (Cl. 250—225)

The present invention relates generally to photo-electric devices and more particularly to assemblies including light attenuators and photo-conductive cells.

In the art of photo-electrical controls, use is made of photo-conductive cells to provide an electrical response as a function of light intensity. Such cells are available commercially, which change in conductivities from essentially open circuit to low resistance circuit condition in response to change of light intensity from full darkness to some predetermined value. The latter value is often required to be adjusted or selected, for a particular application. For example, in the art of street lighting the requirements set forth may call for any specific footcandle turn on level between the .5 and 3 footcandle ranges, i.e. 1 footcandle. The tolerances on commercially available photoelectric cells are in the area of plus and minus 40%. There are also slight variations between the operating characteristics of the relays employed. As such, in order to provide uniformity in operation between units, an attenuating device must be provided which will compensate for these differences. It is, therefore, essential to make provision for attenuation of light, in order to afford adjustment of the "operate" point of a photo-cell circuit. In order to attenuate light falling on a photo-conductive surface, it is known to employ a pair of relatively adjustable polarizing sheets, interposed as a light valve between the source of light and the surface. The present invention addresses itself to the provision of a particularly simple arrangement of polarization attenuator in conjunction with a photo-conductive cell, operating in accordance with generally known principles, but having advantages of simplicity of mechanical structure, leading to economy of fabrication, and flexibility of applications.

In accordance with the invention, briefly described, a relatively large diameter housing is provided for a photo-conductive layer, the latter being circular and sitting on the base of the housing. A cylindrical wall of slight height extends from the base and terminates in an inwardly directed circular lip, leaving the major part of the top of the cylinder exposed to light. A light attenuator in the form of a pair of superposed circular polarizing sheets has the bottom sheet cemented to the lip and the top sheet riveted to the bottom sheet so that the top sheet may be rotated with respect to the bottom sheet. By virtue of such rotation the attenuation introduced in the path of light is adjustable from full open to full closed condition. The rivet may then be used, not only to provide a pivot for the upper sheet but may also be used for mounting the assembly, by means of a hooked wire, one end of which is anchored and the hooked end of which extends about the rivet. In the latter event, cementing is not essential.

The attenuation provided by the polarizing sheets maintains the equal level of illumination over the entire surface of the photo-conductor since the area of the valve approximately equals the area of the photo-conductor. The rivet occupies so small an area relative to the area of the polarizing sheets as not to reduce materially the total light flux falling on the photo-conductive surface, or on any portion thereof, including that directly under the rivet. It is of primary importance that no abrupt differences of conductivity occur over the cell surface. At such locations where this occurs hot spots result, which radically reduce life of the cell. In accordance with the present invention the photo-conductive surface is equally illuminated throughout, for all attenuation settings of the light valve, and hot spots are eliminated.

The cell may be mounted in an opaque housing or enclosure having a circular opening facing the cell and of about the same size, but spaced from the cell. This construction renders the cell sensitive to light emanating generally on a line joining the centers of the opening and cell, and of reduced sensitivity for lines deviating from that line.

If desired, the polarizing sheets may, instead of having the under sheet cemented to the rim of the cell housing, be pressed thereagainst by a wire spring or the like, applied to the rivet, without cementing.

In either construction, no possibility exists for light to impinge directly on the photo-conductive surface, without passing through the sheets and adjustments of attenuation effected before an attenuator cell is assembled in an operating enclosure, hold true after assembly of the cell and attenuator into the enclosure. This enables considerable savings of labor since the housing does not have to be placed over the cell to check operate level, and withdrawn should adjustment be necessary.

It is, accordingly, a broad object of the present invention to provide an effective and economical photo-conductive cell and optical attenuator unit, capable of easy calibration and setting.

The above and still further objects, features and advantages of the present invention will become apparent upon consideration of the following detailed description of one specific embodiment thereof, especially when taken in conjunction with the accompanying drawings, wherein.

Figure 1:
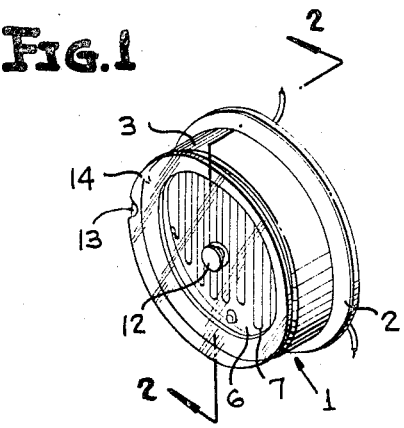
FIGURE 1 is a view in perspective of an assembled cell and attenuator, according to a first embodiment of the invention.

Referring now to the drawings, the reference numeral 1 denotes a casing for a photo-conductor, fabricated of metal, and comprising a circular base 2, cylindrical wall 3 extending from the base 2, and an inwardly directed circular lip 4 at the termination of the wall, on which is cemented a glass window 5, providing a hermetic seal. A circular insulating base 6 lies on or near the bottom of the casing 1, on which is coated a photo-conductive path 7, i.e. a ribbon of cadmium sulphide. The ends of the path 7 are connected to terminals 8 extending outwardly of the base 2, through insulators 9.

Figure 2:
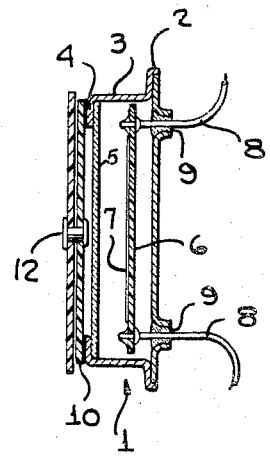
FIGURE 2 is a view in transverse cross-section, taken on line 2—2 of FIGURE 1.

An optical attenuator is provided, which in FIGURES 1 and 2 consists of a first circular sheet of light polarizing material 10, cemented to lip 4, and a second such sheet 11 riveted to the first sheet centrally thereof by rivet 12, so as to permit rotation of sheet 11 with respect to sheet 10. Zero position notches 13, 14 are provided in the edges of sheets 10, 11, which when aligned provide essentially zero, or minimum, optical attenuation. The sheets 10, 11 are fabricated of plastic sheet material, so that light falling on the attenuator tends to be equally distributed over the surface of the path 7. The attenuation provided by the attenuator is equal over its entire area, so that the attenuation introduced is available uniformly over the photo-conductive area.

Figure 3:
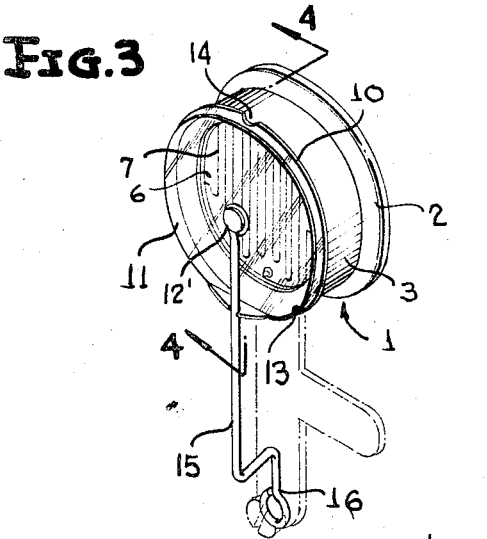
FIGURE 3 is a view in perspective of an assembled cell and attenuator, according to a second embodiment of the invention.
Figure 5:
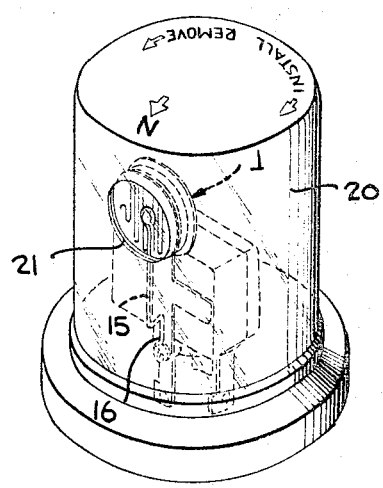
FIGURE 5 is a view in perspective of a cell and attenuator, according to FIGURES 3 and 4, as mounted in an enclosure.
Figure 4:
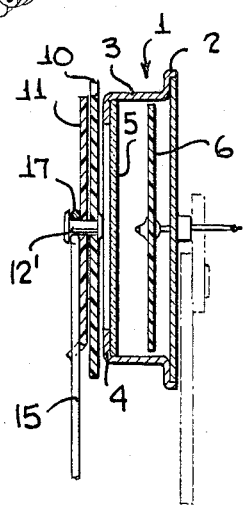
FIGURE 4 is a view in transverse section taken on line 4—4 of FIGURE 3.

In the system of FIGURES 3 and 4, the sheet 10 is not cemented to the lip 4, but a resilient wire 15, is secured at one end 16, and provided with a hook or loop 17 at its other end, which presses the attenuator against the lip 4. To this end the rivet 12' extends through the hook or loop 17, so that the wire 15 and the sheets 10, 11 form a unit, available for positioning over the opening in the casing 1. The sheet 11 is now fixed and the sheet 10 rotatable on rivet 12'.

A cylindrical enclosure 20 may be placed over a cell and attenuator assembly, of the type illustrated in FIGURE 1 or FIGURE 3. The enclosure 20 includes a circular window 21, of about the size of sheets 10, 11 and spaced therefrom by about ¼" to ⅜". Thereby, light can fall on the attenuator only through the window 21, which renders the system highly directional.

For streetlighting control applications, it is desired that the photo-cell system be highly directional and that the cell be oriented to point north. This prevents the cell from being exposed to the direct rays of the sun which decrease the life of the cell. Also, the photo-cells employed have a maximum sensitivity to the blue-green portion of the color spectrum, and the best source of blue light is the north sky.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A lighting control unit photo-sensitive device comprising a metallic casing, said casing having a base, a cylindrical wall extending from said base, said wall terminating in an inwardly directed lip, a planar photo-conductive element mounted on said base, leads extending through said base and connected to said photo-conductive element, an optical attenuator, said optical attenuator comprising a first circular thin sheet of light polarizing material, a second circular thin sheet of light polarizing material, a rivet centrally of said sheets and securing said sheets in contact and in relative rotational relation, said sheets being of approximately the same diameters as said wall, said photo-conductive element covering a substantially circular area approximately equal to the area of each of said sheets, and means securing said sheets against said lip and symmetrically of said lip.

2. The combination according to claim 1, wherein said last means is cement.

3. The combination according to claim 1 wherein said last means is a resilient mounting for said sheets, said mounting including a resilient rod having a loop in one end, said loop encircling said rivet.

4. The combination according to claim 1 wherein is provided an enclosure, said enclosure having a circular window aligned with and spaced from said sheets, to impart directional sensitivity to said device.

5. The combination according to claim 1 wherein said sheets are fabricated of plastic sheet material.

References Cited by the Examiner
UNITED STATES PATENTS

| | | | |
|---|---|---|---|
| 2,773,422 | 12/1956 | Flynn | 88—65 X |
| 3,031,582 | 4/1962 | Benner et al. | 250—239 |
| 3,068,362 | 12/1962 | Ruocchio et al. | 250—225 |

RALPH G. NILSON, *Primary Examiner.*

J. D. WALL, *Assistant Examiner.*